(12) United States Patent
Croak et al.

(10) Patent No.: US 8,615,004 B1
(45) Date of Patent: Dec. 24, 2013

(54) METHOD AND APPARATUS FOR SUPPORTING ON-NET VOIP CALLS FOR CELLULAR SERVICE SUBSCRIBERS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1502 days.

(21) Appl. No.: 11/263,022

(22) Filed: Oct. 31, 2005

(51) Int. Cl.
*H04L 12/66* (2006.01)
*H04M 15/00* (2006.01)

(52) U.S. Cl.
USPC .......... 370/352; 379/114.01; 379/114.28; 379/121.02; 379/127.03

(58) Field of Classification Search
USPC .......... 379/114.28, 121.02, 127.03, 127.04, 379/127.05, 114.01–141
See application file for complete search history.

(56) References Cited

U.S. PATENT DOCUMENTS

| | | | |
|---|---|---|---|
| 6,760,417 B1* | 7/2004 | Wallenius | 379/114.28 |
| 7,002,952 B2* | 2/2006 | Jones | 370/352 |
| 7,068,996 B1* | 6/2006 | Pryor | 455/406 |
| 7,480,372 B2* | 1/2009 | Jin et al. | 379/115.01 |
| 7,603,102 B1* | 10/2009 | Pryor | 455/406 |
| 7,620,162 B2* | 11/2009 | Aaron et al. | 379/111 |
| 2002/0133457 A1* | 9/2002 | Gerlach et al. | 705/39 |
| 2003/0061137 A1* | 3/2003 | Leung et al. | 705/35 |
| 2003/0165222 A1* | 9/2003 | Syrjala et al. | 379/114.26 |
| 2003/0193961 A1* | 10/2003 | Moore et al. | 370/401 |
| 2004/0078349 A1* | 4/2004 | Syrjala et al. | 705/412 |
| 2005/0190747 A1* | 9/2005 | Sindhwani et al. | 370/352 |
| 2005/0197105 A1* | 9/2005 | McCann | 455/412.1 |
| 2006/0019630 A1* | 1/2006 | Sposato et al. | 455/406 |
| 2006/0050720 A1* | 3/2006 | Zaitsu | 370/401 |
| 2006/0116127 A1* | 6/2006 | Wilhoite et al. | 455/442 |

* cited by examiner

*Primary Examiner* — Asad Nawaz
*Assistant Examiner* — Joel Hamel

(57) ABSTRACT

A method and apparatus for enabling a subscriber of VoIP services to register a cellular phone as an on-net device with a defined interface to the VoIP network are disclosed. The present method enables calls placed between originating and terminating subscribers using registered cellular phones to be rerouted between the cellular networks and the VoIP network for call establishment.

15 Claims, 4 Drawing Sheets

METHOD AND APPARATUS FOR SUPPORTING ON-NET VOIP CALLS FOR CELLULAR SERVICE SUBSCRIBERS

The present invention relates generally to communication networks and, more particularly, to a method and apparatus for supporting on-net VoIP calls for cellular service subscribers in communication networks, e.g., packet networks such as Voice over Internet Protocol (VoIP) networks.

BACKGROUND OF THE INVENTION

Across business and consumer customer segments, VoIP network providers frequently offer subscribers unlimited on-net to on-net calling along with a flat rate for a bucket of long distance calling minutes. An on-net call is a call that is originated from a registered endpoint in a network and is terminated on another registered endpoint in the same network. A subscriber who has an endpoint device, such as a cellular phone, that is not registered as on-net device with the network will not be able to take advantage of the flat rate VoIP calling offers. Phone calls made from or to the unregistered cellular phone incur additional cost that is not part of the flat rate VoIP calling offers.

Therefore, a need exists for a method and apparatus for supporting on-net VoIP calls for cellular service subscribers in a packet network, e.g., a VoIP network.

SUMMARY OF THE INVENTION

In one embodiment, the present invention provides a method to enable a subscriber of VoIP services to register a cellular phone as an on-net device with a defined interface to the VoIP network. The present invention enables calls placed between originating and terminating subscribers using registered cellular phones to be rerouted between the cellular networks and the VoIP network for call establishment.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
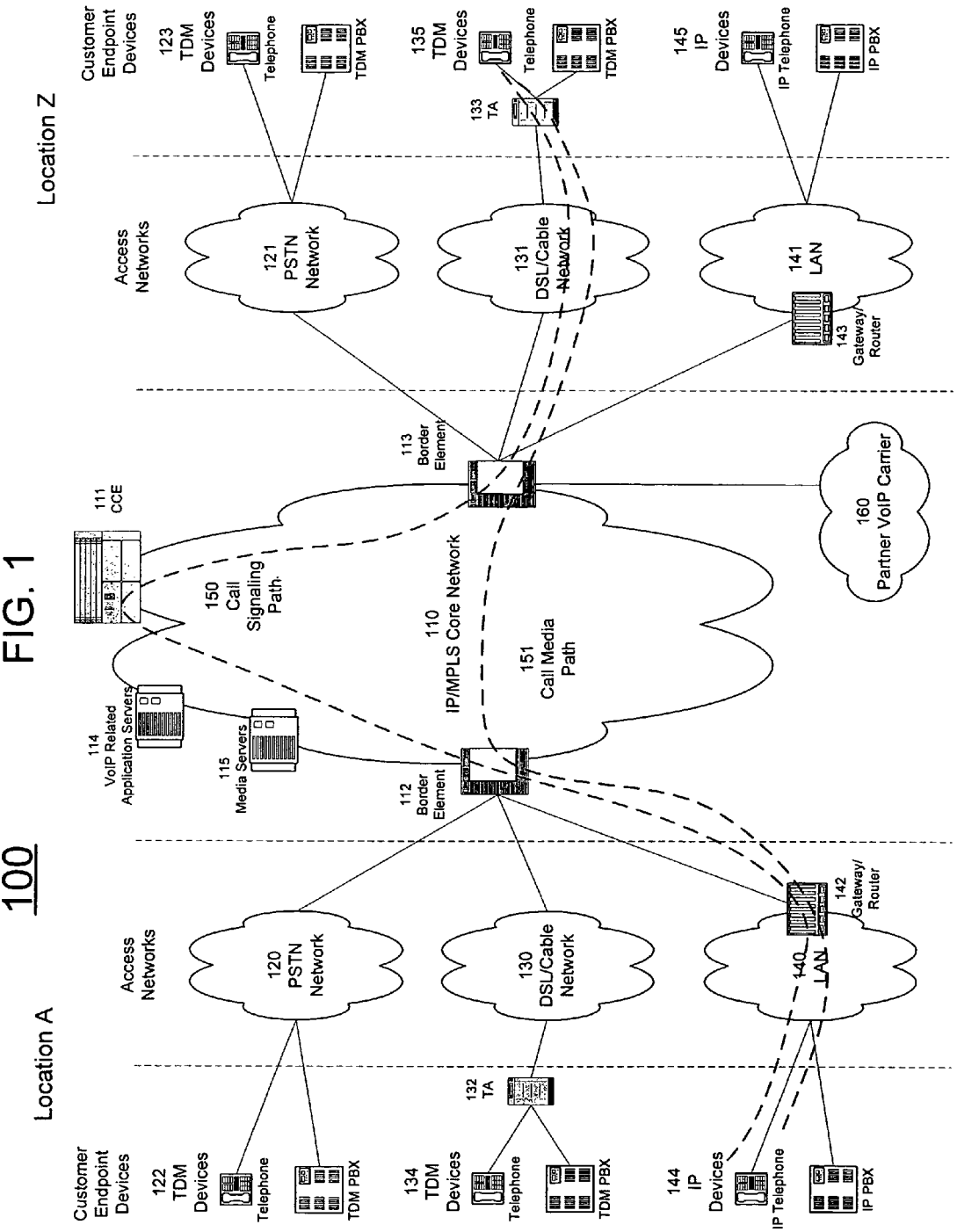
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Across business and consumer customer segments, VoIP network providers frequently offer subscribers unlimited on-net to on-net calling along with a flat rate for a bucket of long distance calling minutes. An on-net call is a call that is originated from a registered endpoint in a network and is terminated on another registered endpoint in the same network. A subscriber who has an endpoint device, such as a cellular phone, that is not registered as on-net device with the network will not be able to take advantage of the flat rate VoIP calling offers. Phone calls made from or to the unregistered cellular phone incur additional cost that is not part of the flat rate VoIP calling offers.

To address this need, the present invention provides a method to enable a subscriber of VoIP services to register a cellular phone as an on-net device with a defined interface to the VoIP network. The present invention enables calls placed between originating and terminating subscribers using registered cellular phones to be rerouted between the cellular networks and the VoIP network for call establishment.

Figure 2:
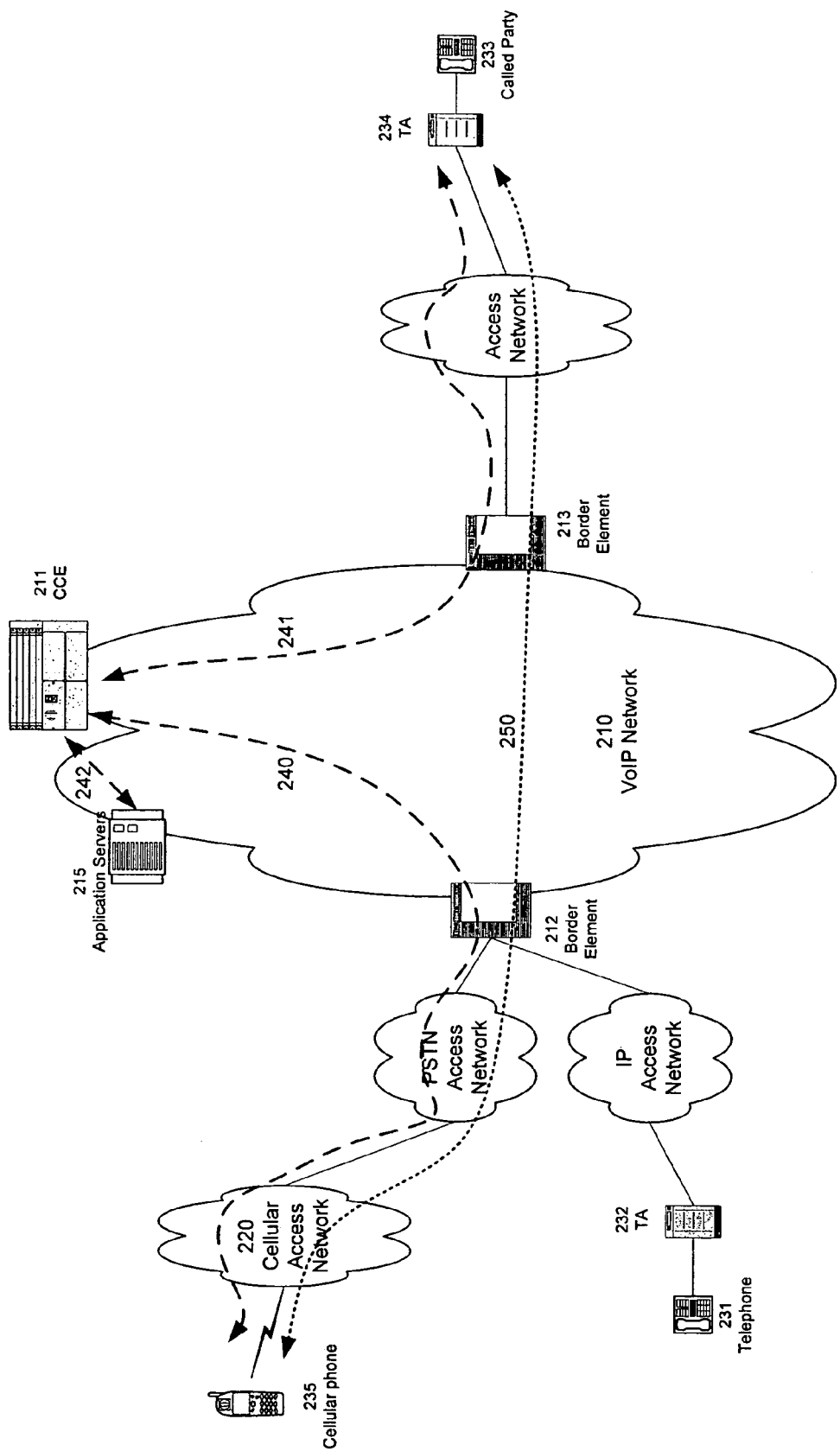
FIG. 2 illustrates an example of supporting on-net VoIP calls for cellular service subscribers in a VoIP network of the present invention.

FIG. 2 illustrates an example 200 of supporting on-net VoIP calls for cellular service subscribers in a packet network, e.g., a VoIP network of the present invention. In FIG. 2, a subscriber uses telephone 231 to access subscriber VoIP services provide by VoIP network 210 via TA 232. The subscriber is also a subscriber of cellular services of cellular network 220 and uses cellular phone 235 to access cellular services provided by cellular network 220. The subscriber registers cellular phone 235 as a registered endpoint device with VoIP network 210. Therefore, cellular phone 235 is an on-net device for VoIP network 210. When the subscriber places a call to called party 233, who is another subscriber of VoIP services of VoIP network 210, the call is considered an on-net call. An on-net call is a call that is originated from a registered endpoint in a network and is terminated on another registered endpoint in the same network.

The call setup message associated with the call is received via BE 212 and forwarded to CCE 221 using flow 240 for processing. CCE 211 communicates with AS 215 using flow 242 to determine that the calling party number belongs to registered cellular phone 235 of the subscriber and that the called party endpoint, TA 234 of called party 233, is also a registered VoIP endpoint in VoIP network 210. CCE 211 then forwards the call setup message to TA 234 via BE 213 using flow 241 for call completion. Once the call setup procedures have been successfully completed, call media path 250 is established for voice communications between the subscriber using cellular phone 235 and called party 233.

When the call is terminated, CCE 211 updates the billing record of the completed call accordingly. Since the call is from an on-net device, registered cellular phone 235, to another on-net device, TA 234, the call will be billed as an on-net call using the monthly allocated long distance call minutes of the subscriber of TA 232. The call is billed as an on-net call by a billing system with call records forwarded by CCE 211. Thus, an on-net call applies to a call from a registered cellular phone device to a registered cellular phone device or another registered VoIP endpoint device, or from a registered VoIP endpoint device to another registered cellular phone device or a registered VoIP endpoint device.

Figure 3:
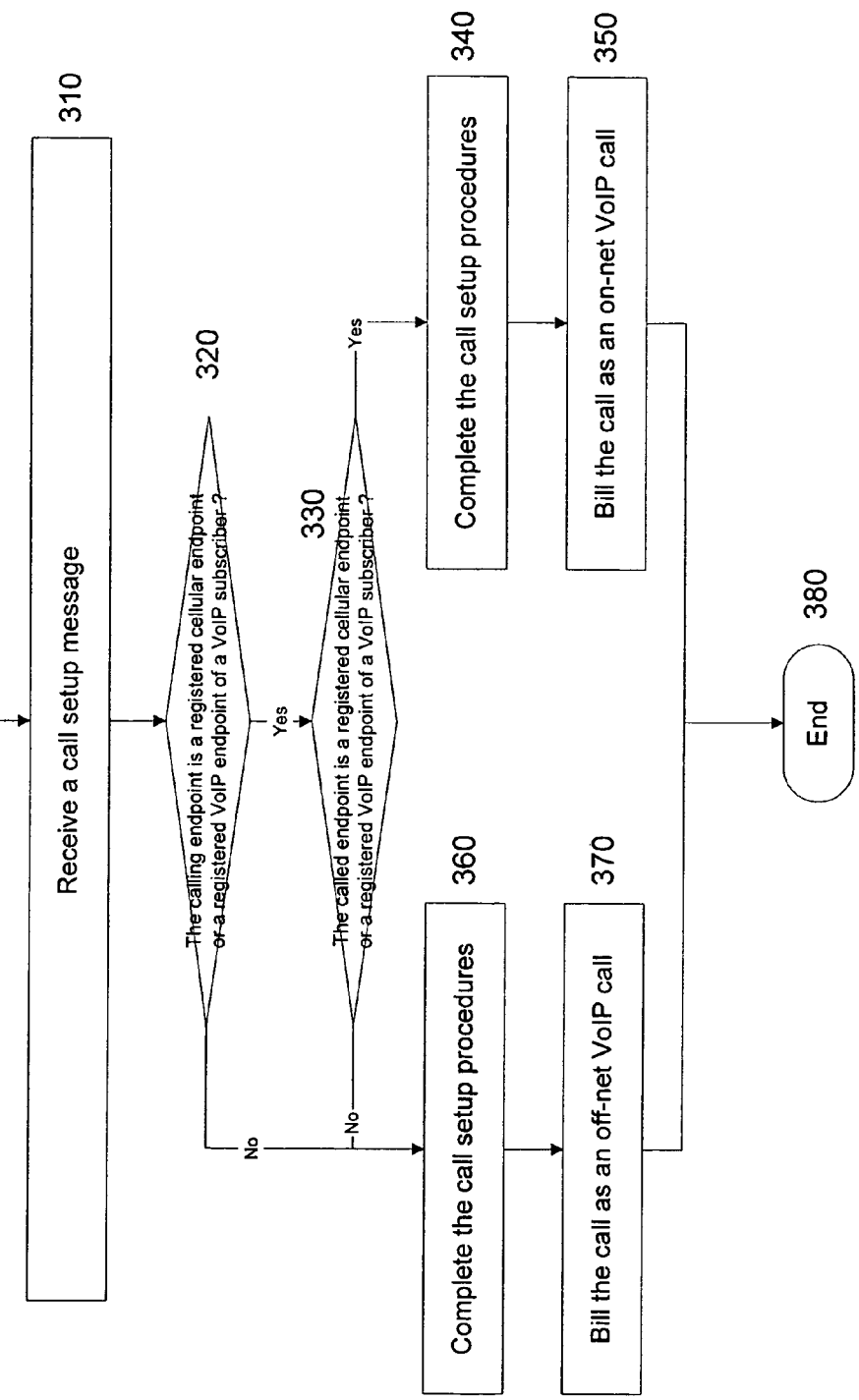
FIG. 3 illustrates a flowchart of a method for supporting on-net VoIP calls for cellular service subscribers in a packet network, e.g., a VoIP network, of the present invention.

FIG. 3 illustrates a flowchart of a method 300 for supporting on-net VoIP calls for cellular service subscribers in a packet network, e.g., a VoIP network, of the present invention. Method 300 starts in step 305 and proceeds to step 310.

In step 310, the method receives a call setup message. For example, the call setup message is received by a CCE.

In step 320, the method checks if the calling endpoint is a registered VoIP endpoint device or a registered cellular endpoint device. The calling endpoint is checked by the CCE by communicating with an AS to verify if the calling endpoint device is an on-net endpoint device. If the calling endpoint is a registered VoIP endpoint device or a registered cellular endpoint device, the method proceeds to step 330; otherwise, the method proceeds to step 360.

In step 330, the method checks if the called endpoint is a registered VoIP endpoint device or a registered cellular endpoint device. The called endpoint is checked by the CCE by communicating with an AS to verify if the called endpoint device is an on-net endpoint device. If the called endpoint is a registered VoIP endpoint device or a registered cellular endpoint device, then the method proceeds to step 340; otherwise, the method proceeds to step 360.

In step 340, the method completes the call setup procedures. The call setup procedures are completed by the CCE.

In step 350, the method bills the call as an on-net VoIP call. For example, the call is billed as an on-net call by a billing system with call records forwarded by the CCE. A VoIP subscriber is allocated a number of long distance minutes based on a flat billing rate and the allocated long distance minutes apply to all on-net calls with no additional call charges.

In step 360, the method completes the call setup procedures. The call setup procedures are completed by the CCE.

In step 370, the method bills the call as an off-net VoIP call. For example, the call is billed as an off-net call by a billing system with call records forwarded by the CCE. An off-net call cannot take advantage of the allocated long distance minutes provided to a VoIP subscriber and will incur long distance call charges on a per minute basis. The method ends in step 380.

Figure 4:
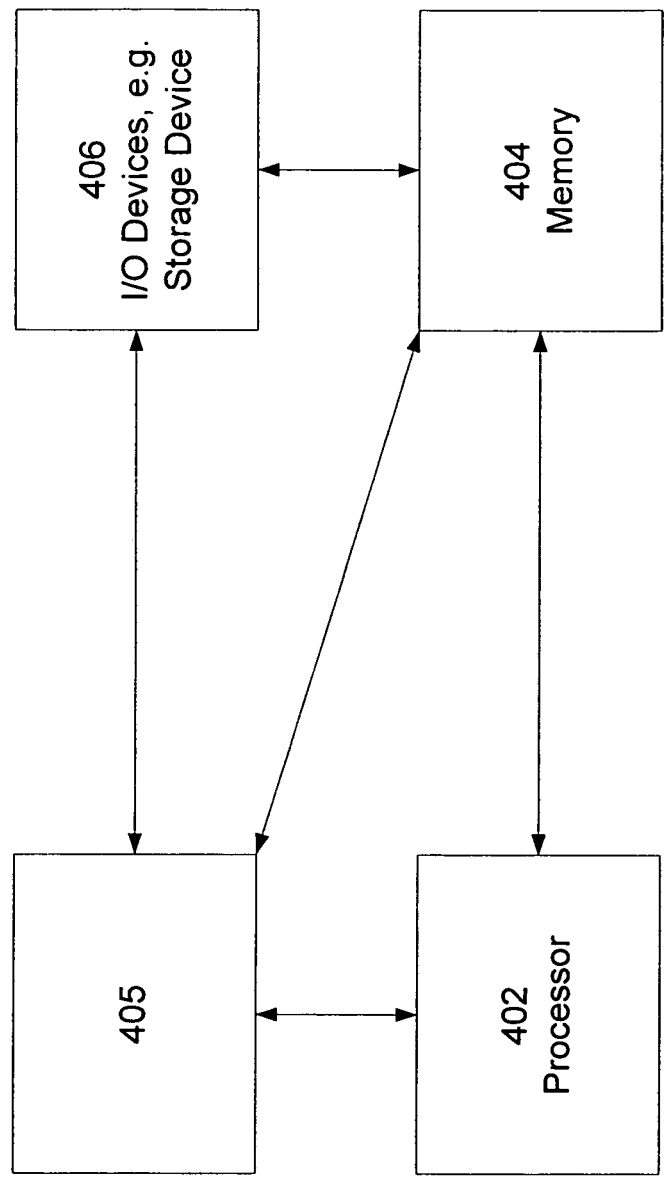
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for supporting on-net VoIP calls for cellular service subscribers, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for supporting on-net VoIP calls for cellular service subscribers can be loaded into memory 404 and executed by processor 402 to implement the functions as discussed above. As such, the present process 405 for supporting on-net VoIP calls for cellular service subscribers (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for supporting on-net calls in a voice over internet protocol network, comprising:
    registering a first cellular endpoint device of a subscriber with the voice over internet protocol network to be a registered on-net endpoint device, wherein the first cellular endpoint device is also registered with a cellular access network, wherein the registering comprises registering a telephone number of the first cellular endpoint device with the voice over internet protocol network, wherein the first cellular endpoint device only connects to the voice over internet protocol network via the cellular access network;
    receiving a call setup message in the voice over internet protocol network for a call from an originating registered on-net endpoint device to a terminating registered on-net endpoint device, where the originating registered on-net endpoint device is the first cellular endpoint device that is accessed via the cellular access network for the call, and where the terminating registered on-net endpoint device is a second cellular endpoint device that only connects to the voice over internet protocol network via a cellular access network;
    categorizing the call as an on-net call in the voice over internet protocol network, wherein the on-net call is a call that is originated from a registered on-net endpoint in the voice over internet protocol network and is terminated on another registered on-net endpoint in the same voice over internet protocol network, wherein the categorizing comprises consulting the telephone number to determine that the first cellular endpoint device is a registered on-net endpoint device; and
    applying an on-net billing rate to the call, wherein the subscriber has an account with the voice over internet protocol network that defines the on-net billing rate, wherein the on-net billing rate includes unlimited on-net to on-net calling along with a flat rate for a bucket of long distance minutes.

2. The method of claim 1, wherein the voice over internet protocol network is a service over internet protocol network.

3. The method of claim 1, wherein the call setup message is received by a call control element.

4. The method of claim 3, wherein the originating registered on-net endpoint device and the terminating registered on-net endpoint device are verified as authentic on-net endpoint devices by the call control element by communicating with an application server.

5. The method of claim 1, wherein the call is categorized as the on-net call by a call control element.

6. The method of claim 1, wherein the call is billed as the on-net call by a billing system with call records forwarded by a call control element.

7. The method of claim 1, wherein the on-net billing rate applies a monthly allocated total number of call minutes to the call.

8. A non-transitory computer-readable medium storing instructions which, when executed by a processor, cause the processor to perform operations for supporting on-net calls in a voice over internet protocol network, the operations comprising:
    registering a first cellular endpoint device of a subscriber with the voice over internet protocol network to be a registered on-net endpoint device, wherein the first cellular endpoint device is also registered with a cellular access network, wherein the registering comprises registering a telephone number of the first cellular endpoint device with the voice over internet protocol network, wherein the first cellular endpoint device only connects to the voice over internet protocol network via the cellular access network;
    receiving a call setup message in the voice over internet protocol network for a call from an originating registered on-net endpoint device to a terminating registered on-net endpoint device, where the originating registered on-net endpoint device is the first cellular endpoint device that is accessed via the cellular access network for the call, and where the terminating registered on-net endpoint device is a second cellular endpoint device that only connects to the voice over internet protocol network via a cellular access network;
    categorizing the call as an on-net call in the voice over internet protocol network, wherein the on-net call is a call that is originated from a registered on-net endpoint in the voice over internet protocol network and is terminated on another registered on-net endpoint in the same voice over internet protocol network, wherein the categorizing comprises consulting the telephone number to determine that the first cellular endpoint device is a registered on-net endpoint device; and applying an on-net billing rate to the call, wherein the subscriber has an account with the voice over internet protocol network that defines the on-net billing rate, wherein the on-net billing rate includes unlimited on-net to on-net calling along with a flat rate for a bucket of long distance minutes.

9. The non-transitory computer-readable medium of claim 8, wherein the voice over internet protocol network is a service over internet protocol network.

10. The non-transitory computer-readable medium of claim 8, wherein the call setup message is received by a call control element.

11. The non-transitory computer-readable medium of claim 10, wherein the originating registered on-net endpoint device and the terminating registered on-net endpoint device are verified as authentic on-net endpoint devices by the call control element by communicating with an application server.

12. The non-transitory computer-readable medium of claim 8, wherein the call is categorized as an on-net call by a call control element.

13. The non-transitory computer-readable medium of claim 8, wherein the call is billed as an on-net call by a billing system with call records forwarded by a call control element.

14. The non-transitory computer-readable medium of claim 8, wherein the on-net billing rate applies a monthly allocated total number of call minutes to the call.

15. An apparatus for supporting on-net calls in a voice over internet protocol network, comprising:
   a processor; and
   a computer-readable medium storing instructions which, when executed by the processor, cause the processor to perform operations, the operations comprising:

registering a first cellular endpoint device of a subscriber with the voice over internet protocol network to be a registered on-net endpoint device, wherein the first cellular endpoint device is also registered with a cellular access network, wherein the registering comprises registering a telephone number of the first cellular endpoint device with the voice over internet protocol network, wherein the first cellular endpoint device only connects to the voice over internet protocol network via the cellular access network;

receiving a call setup message in the voice over internet protocol network for a call from an originating registered on-net endpoint device to a terminating registered on-net endpoint device, where the originating registered on-net endpoint device is the first cellular endpoint device that is accessed via the cellular access network for the call, and where the terminating registered on-net endpoint device is a second cellular endpoint device that only connects to the voice over internet protocol network via a cellular access network;

categorizing the call as an on-net call in the voice over internet protocol network, wherein the on-net call is a call that is originated from a registered on-net endpoint in the voice over internet protocol network and is terminated on another registered on-net endpoint in the same voice over internet protocol network, wherein the categorizing comprises consulting the telephone number to determine that the first cellular endpoint device is a registered on-net endpoint device; and applying an on-net billing rate to the call, wherein the subscriber has an account with the voice over internet protocol network that defines the on-net billing rate, wherein the on-net billing rate includes unlimited on-net to on-net calling along with a flat rate for a bucket of long distance minutes.

* * * * *